United States Patent [19]
McClure et al.

[11] Patent Number: 5,787,086
[45] Date of Patent: Jul. 28, 1998

[54] METHOD AND APPARATUS FOR EMULATING A CIRCUIT CONNECTION IN A CELL BASED COMMUNICATIONS NETWORK

[75] Inventors: Robert B. McClure, Hollis; Stephen A. Caldara, Sudbury; Stephen A. Hauser, Burlington; Thomas A. Manning, Northboro, all of Mass.

[73] Assignees: Fujitsu Network Communications, Inc., Richardson, Tex.; Fujitsu Limited, Kawasaki, Japan

[21] Appl. No.: 684,641

[22] Filed: Jul. 18, 1996

Related U.S. Application Data

[60] Provisional application No. 60/001,498, Jul. 19, 1995.
[51] Int. Cl.$^6$ .............................. H04L 12/28; H04L 12/56
[52] U.S. Cl. ...................................... 370/413; 370/464
[58] Field of Search .................................. 370/356, 395, 370/396, 399, 400, 409, 412, 413, 418, 229, 230, 231, 235, 252, 468

[56] References Cited

U.S. PATENT DOCUMENTS

| | | |
|---|---|---|
| 4,837,761 | 6/1989 | Isono et al. |
| 4,870,641 | 9/1989 | Pattavina |
| 4,878,216 | 10/1989 | Yunoki |
| 4,920,531 | 4/1990 | Isono et al. |
| 4,993,018 | 2/1991 | Hajikano et al. |
| 5,084,867 | 1/1992 | Tachibana et al. |
| 5,119,369 | 6/1992 | Tanabe et al. |
| 5,151,897 | 9/1992 | Suzuki |
| 5,185,743 | 2/1993 | Murayama et al. |
| 5,197,067 | 3/1993 | Fujimoto et al. |
| 5,257,311 | 10/1993 | Naito et al. .......................... 380/48 |
| 5,265,088 | 11/1993 | Takigawa et al. |
| 5,268,897 | 12/1993 | Komine et al. |
| 5,271,010 | 12/1993 | Miyake et al. |
| 5,280,469 | 1/1994 | Taniguchi et al. |
| 5,283,788 | 2/1994 | Morita et al. |
| 5,287,349 | 2/1994 | Hyodo et al. |
| 5,287,535 | 2/1994 | Sakagawa et al. |
| 5,295,134 | 3/1994 | Yoshimura et al. |
| 5,301,055 | 4/1994 | Bagchi et al. .......................... 359/139 |
| 5,301,190 | 4/1994 | Tsukuda et al. |
| 5,301,193 | 4/1994 | Toyofuku et al. |
| 5,305,311 | 4/1994 | Lyles |
| 5,309,431 | 5/1994 | Tominaga et al. |
| 5,313,458 | 5/1994 | Suzuki |
| 5,335,222 | 8/1994 | Kamoi et al. |
| 5,355,372 | 10/1994 | Sengupta et al. |
| 5,357,510 | 10/1994 | Norizuki et al. |

(List continued on next page.)

OTHER PUBLICATIONS

*Head of Line Arbitration in ATM Switches With Input–Output Buffering and Backpressure Control.* By Hosein F. Badran and H. T. Mouftah, Globecom '91, pp. 0347–0351.

Primary Examiner—Ajit Patel
Attorney, Agent, or Firm—Weingarten, Schurgin, Gagnebin & Hayes LLP

[57] ABSTRACT

The invention comprises a method and apparatus for emulating a circuit connection in a cell based communications network. A virtual connection is sent from a source connected to the network to a node in the network wherein the virtual connection comprises a series of data cells comprising a header portion and a data portion. The virtual connection is transported across at least one communications link connecting the first node to a second node in the network. A first queue is dedicated to the virtual connection at each node in the network through which the signal passes. The queue comprises a first amount of buffer space, is dedicated for the duration of the circuit connection and, dedicated only to that virtual connection. A first amount of link bandwidth is allocated to the virtual connection on each communications link across which the virtual connection passes. The amount of link bandwidth is allocated for the duration of the circuit connection and is allocated only to that particular virtual connection. The virtual connection is received at a destination connected to the communications network at a node of the communications network.

11 Claims, 2 Drawing Sheets

U.S. PATENT DOCUMENTS

| | | | |
|---|---|---|---|
| 5,361,251 | 11/1994 | Aihara et al. | |
| 5,363,433 | 11/1994 | Isono | |
| 5,375,117 | 12/1994 | Morita et al. | |
| 5,379,297 | 1/1995 | Glover et al. | |
| 5,392,402 | 2/1995 | Robrock, II | |
| 5,394,397 | 2/1995 | Yanagi et al. | |
| 5,400,337 | 3/1995 | Munter | |
| 5,432,713 | 7/1995 | Takeo et al. | 364/514 |
| 5,446,733 | 8/1995 | Tsuruoka | |
| 5,452,296 | 9/1995 | Shimizu | |
| 5,459,743 | 10/1995 | Fukuda et al. | 371/67.1 |
| 5,463,620 | 10/1995 | Sriram | 370/395 |
| 5,479,401 | 12/1995 | Bitz et al. | |
| 5,479,402 | 12/1995 | Hata et al. | |
| 5,487,063 | 1/1996 | Kakuma et al. | |
| 5,497,369 | 3/1996 | Wainwright | |
| 5,504,742 | 4/1996 | Kakuma et al. | |
| 5,506,834 | 4/1996 | Sekihata et al. | |
| 5,506,839 | 4/1996 | Hatta | |
| 5,509,001 | 4/1996 | Tachibana et al. | |
| 5,509,007 | 4/1996 | Takashima et al. | |
| 5,513,178 | 4/1996 | Tanaka | |
| 5,513,180 | 4/1996 | Miyake et al. | |
| 5,517,495 | 5/1996 | Lund et al. | 370/395 |
| 5,521,917 | 5/1996 | Watanabe et al. | |
| 5,523,999 | 6/1996 | Takano et al. | |
| 5,528,590 | 6/1996 | Iidaka et al. | |
| 5,535,196 | 7/1996 | Aihara et al. | |
| 5,537,394 | 7/1996 | Abe et al. | |
| 5,544,169 | 8/1996 | Norizuki et al. | |
| 5,544,170 | 8/1996 | Kasahara | |
| 5,550,821 | 8/1996 | Akiyoshi | |
| 5,550,823 | 8/1996 | Irie et al. | 370/395 |
| 5,553,057 | 9/1996 | Nakayama | |
| 5,555,243 | 9/1996 | Kakuma et al. | |
| 5,555,265 | 9/1996 | Kakuma et al. | |
| 5,568,479 | 10/1996 | Watanabe et al. | |
| 5,570,361 | 10/1996 | Norizuki et al. | |
| 5,570,362 | 10/1996 | Nishimura | |
| 5,572,522 | 11/1996 | Calamvokis et al. | |
| 5,577,032 | 11/1996 | Sone et al. | |
| 5,577,035 | 11/1996 | Hayter et al. | 370/395 |
| 5,583,857 | 12/1996 | Soumiya et al. | 370/233 |
| 5,583,858 | 12/1996 | Hanaoka | 370/392 |
| 5,583,861 | 12/1996 | Holden | 370/395 |
| 5,590,132 | 12/1996 | Ishibashi et al. | 370/236 |
| 5,602,829 | 2/1997 | Nie et al. | 370/235 |
| 5,610,913 | 3/1997 | Tomonaga et al. | 370/219 |
| 5,623,405 | 4/1997 | Isono | 395/230 |
| 5,625,846 | 4/1997 | Kobayakawa et al. | 395/872 |
| 5,633,861 | 5/1997 | Hanson et al. | 370/232 |

METHOD AND APPARATUS FOR EMULATING A CIRCUIT CONNECTION IN A CELL BASED COMMUNICATIONS NETWORK

RELATED APPLICATIONS

This application claims the benefit of U.S. Provisional application Ser. No. 60/001,498, filed Jul. 19, 1995.

TECHNICAL FIELD OF THE INVENTION

The invention relates generally to communications networks and more particularly to a method and apparatus for emulating a circuit connection in a cell based communications network.

BACKGROUND OF THE INVENTION

Cell based communications networks such as asynchronous transfer ("ATM") networks are used to transfer audio, video, and data. ATM networks transfer data by routing data units such as ATM cells from a source to a destination through switches. Switches include input/output ports through which ATM cells are received and transmitted.

Existing ATM switches can be divided into several classes. One type of switch uses one large queue as a buffer and controls the access of individual virtual connections to bandwidth on a statistical basis. As a general matter, each virtual connection through this type of switch shares one large buffer and each virtual connection statistically shares the available bandwidth of the switch and/or on an output link connected to the switch. This approach suffers from several disadvantages. Depending upon the type of traffic traveling through an ATM network, one may want to control certain network service parameters associated with that traffic type. Examples of parameters that may be desirably controlled by an ATM network include a connection's delay variation, its end-to-end delay, its maximum data loss, its access to guaranteed bandwidth, its access and priority of access to shared bandwidth, and its delivery priority. Unfortunately, ATM switches employing the above approach cannot create quality of service guarantees on a per connection basis or even provide quality of service (QOS) guarantees on a per traffic type basis. Instead, quality of service guarantees can only be statistical in nature. In addition, head of line blocking in this approach can block connections behind the blocked connection.

A second approach employs a plurality of queues in each switch and allocates switch bandwidth statistically. Further refinements of this approach may assign particular connections to a particular queue based upon a characteristic of the connection such as the traffic type of the connection or the group from which the connection originated. In general, this approach is characterized by sharing each of a plurality of queues by a plurality of connections and sharing the switch bandwidth and/or output link bandwidth among all connections. This approach also has several disadvantages. Quality of service based upon the above parameters can only be guaranteed on a per queue basis and the guarantees that can be made for low priority traffic are not strong guarantees. In addition, the quality of service guarantees for multiple queues can only be made on a statistical basis rather than on a per connection basis. This approach also suffers from head of line blocking in each individual queue. Thus, certain connections may block other connections behind it.

A third approach uses a plurality of queues and assigns a plurality of connections to each queue and allocates either switch bandwidth and/or link bandwidth on a per queue basis. This approach also suffers from several disadvantages. Again, the quality of network service can only be guaranteed on a per queue basis rather than on a per connection basis. Also, unused allocated switch bandwidth and/or link bandwidth cannot be used by another queue. Accordingly, this bandwidth remains unused, resulting in an inefficient use of system resources.

SUMMARY OF THE INVENTION

The invention comprises a method and apparatus for emulating a circuit connection in a cell based communications network. In accordance with the method of the invention, a virtual connection is sent from a source connected to the communications network to a node in the communications network wherein the virtual connection comprises a series of data cells comprising a header portion and a data portion. The signal is transported across at least one communications link connecting the first node to a second node in the communications network. A first queue is dedicated to the virtual connection at each node in the communications network through which the virtual connection passes. The first queue comprises a first amount of buffer space, is dedicated for the duration of the circuit connection and is dedicated only to the virtual connection. A first amount of link bandwidth is allocated to the virtual connection on each communications link across which the virtual connection passes. That amount of link bandwidth is allocated for the duration of the circuit connection and is allocated only to that virtual connection. The virtual connection is received at a destination connected to the communications network at a node of the communications network.

The invention allows quality of service guarantees based upon network service parameters to be made on a per connection basis. Thus, the invention can be used for efficiently transporting disparate types of traffic across a cell based communications network. For constant bit rate (CBR) services, the invention allows delay variation, end-to-end delay and bandwidth to be guaranteed on a per virtual connection basis. In addition, the invention allows the guarantee of "no cell loss" for a constant bit rate traffic other than link bit errors. The term "no cell loss" refers to preventing cell loss caused by network congestion due to buffer overflow.

For variable bit rate services, a portion of switch and link resources may be allocated to a variable bit rate (VBR) virtual connection and other switch and link resources may be dynamically shared among that particular virtual connection and other traffic on the network. For the portion of services that are allocated, the delay variation, end-to-end delay, bandwidth, and maximum data loss can be guaranteed for a variable bit rate virtual connection. For bandwidth above the allocated portion, maximum data loss can be guaranteed on a statistical basis. In addition, priority access to dynamic bandwidth and delivery priority can be guaranteed for a particular variable bit rate virtual connection.

For an available bit rate (ABR) virtual connection, the invention can guarantee no cell loss and priority access to dynamic bandwidth either in a switch, on a link, or both. Like variable bit rate services, a portion of switch and/or link resources may be allocated to an available bit rate virtual connection while other resources may be shared with other virtual connections. For the allocated portion of a virtual connection, the bandwidth of that connection can be guaranteed.

For unspecified bit rate services, the invention allows a guarantee of priority access to dynamic bandwidth and of delivery priority.

Accordingly, the invention allows quality of service guarantees to be made for disparate types of traffic that may be transported using a communications network employing the present invention. The invention avoids the shortcomings of the prior art by applying queuing and bandwidth management mechanisms to individual connections as well as to a group of connections. Without the per virtual connection queuing mechanism of the invention, resources may not be precisely allocated to individual flows so that quality of service guarantees are enduring for the life of a connection. The invention allows quality of service guarantees to be maintained regardless of how many other virtual connections are added or deleted during the duration of the connection.

A communications network constructed in accordance with the invention may also achieve 100% network occupancy rates on a link-by-link basis while maintaining constant bit rate bandwidth and delay guarantees and available bit rate quality of service guarantees in an integrated services environment. The invention thus allows efficient use of network resources by devices connected to the communications network, that have varying traffic patterns and quality of service needs.

BRIEF DESCRIPTION OF THE DRAWINGS

For a more complete understanding of the present invention and the advantages thereof, reference is now made to the following descriptions taken in conjunction with the accompanying drawings in which.

DETAILED DESCRIPTION OF THE INVENTION

Figure 1:
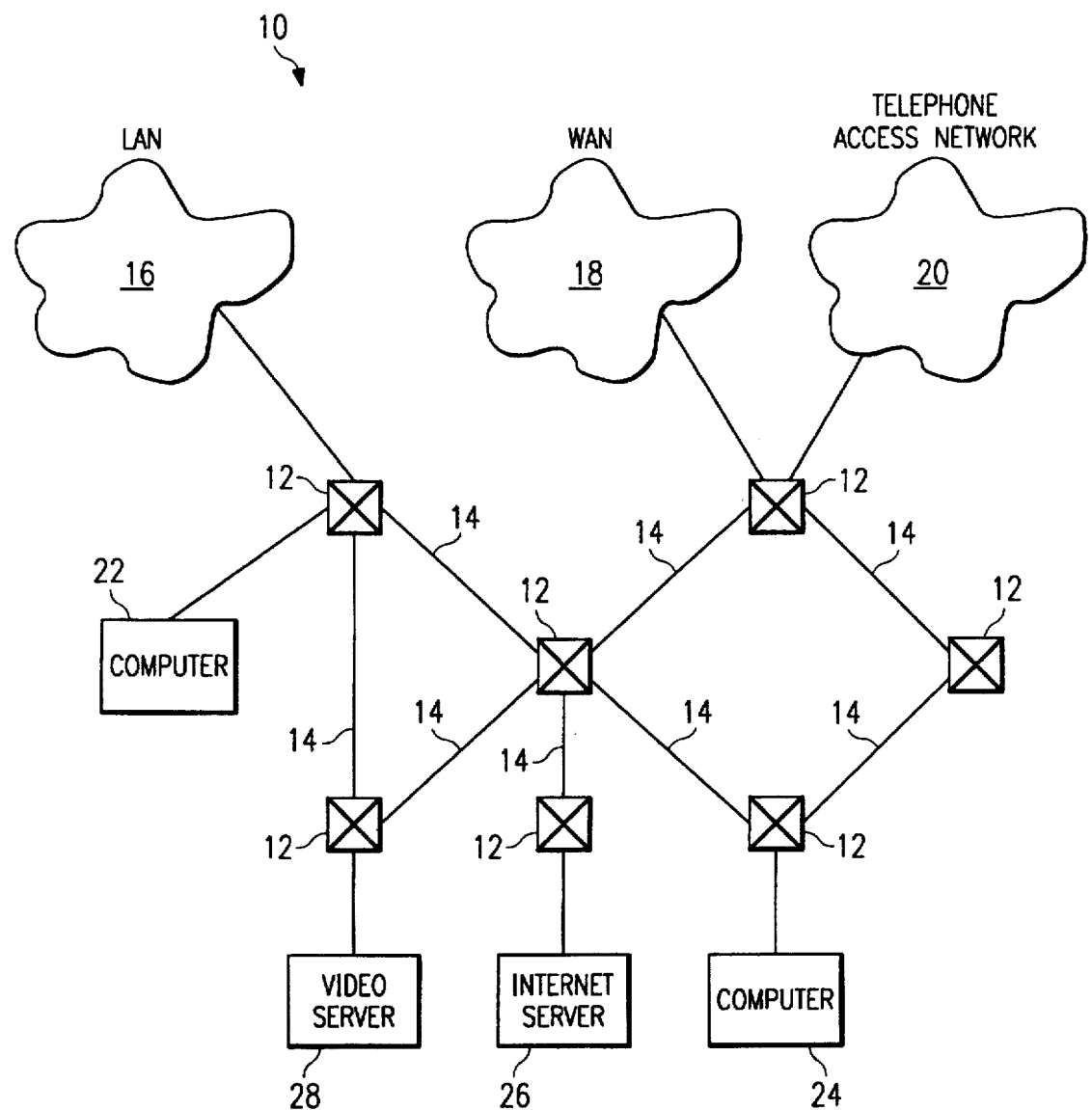
FIG. 1 illustrates a communications network constructed in accordance with the teachings of the invention.
Figure 2:
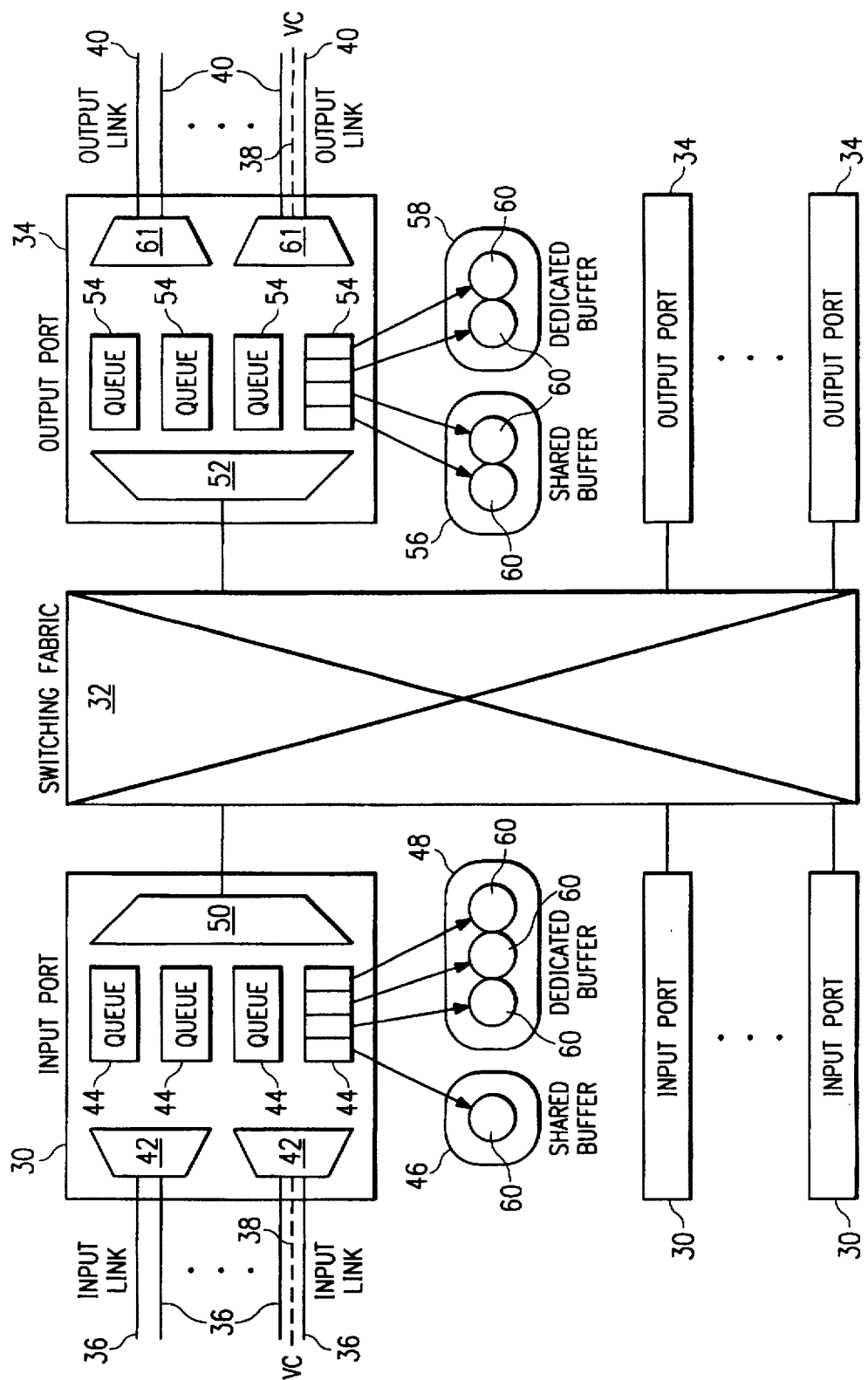
FIG. 2 illustrates a first embodiment of a communications device constructed in accordance with the teachings of the invention.

The preferred embodiment of the present invention and its advantages are best understood by referring to FIGS. 1 and 2 of the drawings, like numerals being used for like and corresponding parts of the various drawings.

FIG. 1 illustrates a communications network 10 constructed in accordance with the teachings of the invention. Communications network 10 is a cell based network and in this embodiment comprises an asynchronous transfer mode (ATM) network. Communications network 10 could be another type of network without departing from the scope of the invention. Communications network 10 comprises a series of communications devices 12 (also referred to as nodes) connected by a series of communications links 14. In this embodiment, each communications device 12 comprises an ATM switch. Other types of switches could be used without departing from the scope of the invention. Each communications link 14 may comprise any type of communications link, such as a SONET link.

A number of communications devices and networks may be connected to communications network 10. In this embodiment, communications network 10 is connected to local area network 16, wide area network 18, telephone access network 20, first computer 22, second computer 24, Internet server 26 and video server 28. Other types of communications devices (or networks) could also be connected to communications network 10 and some or all of the illustrated devices (or networks) could be omitted without departing from the scope of the invention. Each of these communications devices (or networks) communicates with communications network 10 using ATM cells. These devices (or networks) may use a communications protocol other than ATM for internal communications. For such devices, a mechanism is provided to translate the communications protocol to ATM and from ATM to the communications protocol for the particular device or network. This mechanism may be provided either inside of one of the communications devices 12 or inside the particular device or network connected to communications network 10.

When a first device connected to communications network 10 desires to communicate with a second device connected to communications network 10, it sends data over communications network 10. The data is sent from the first device over one or more communication links 14 and through one or more communications devices 12 to the second device, thus forming a virtual connection between the first device and the second device. A communications device 12 switches numerous virtual connections through communications device 12 and each communications link 14 carries numerous virtual connections between two communications devices 12.

Communications network 10 is an integrated services network. Thus, communications network 10 can be used to transport varying types of ATM services. Examples of ATM services that may be transported through communications network 10 include constant bit rate services, variable bit rate services, available bit rate services, and unspecified bit rate services. The invention allows efficient transport of each of these traffic types and allows a certain quality of service guarantees to be made regarding each traffic type or virtual connection.

In accordance with one aspect of the invention, a unique queue is assigned to each virtual connection passing through a communications device 12. A specific embodiment of per virtual connection queuing will be described in connection with FIG. 2 below. In the embodiment illustrated in FIG. 2, both an input queue and an output queue are associated with each virtual connection. These queues are uniquely assigned to a particular virtual connection. Thus, queues are not shared among virtual connections. Some switches may employ only an input queue, only an output queue, or queues in addition to an input and output queue. The teachings of the invention can be applied to any queue associated with a communications device 12 by assigning queues on a per connection basis. As will be discussed more fully below, per virtual connection queuing allows queuing and bandwidth management mechanisms to be applied to individual connections rather than a group of connections. Queuing management mechanisms include control over buffering of virtual connections. Per virtual connection queuing allows precise allocation of network resources to individual virtual connections so that quality of service guarantees are enduring for the life of the virtual connection. These guarantees may be maintained regardless of how many other connections are added or deleted.

In operation, a plurality of input signals are received on input ports of communications device 12 wherein at least one input signal includes at least one virtual connection. In this embodiment, a unique input queue and a unique output queue are associated with each virtual connection. Queues in this embodiment are logical structures implemented using a linked list of pointers. Each queue may be associated with one or more buffer pools. In this embodiment, each queue may be associated with two buffer pools—a shared buffer pool and a dedicated buffer pool. Data associated with the first virtual connection is queued in the unique input queue for transport through a switching fabric connected with the input port. Data that is passed through the switching fabric is queued in the unique output queue associated with the virtual connection for transport over an output communications link. As will be described more fully below, another aspect of the invention is the method of implementing per virtual connection queuing.

A second aspect of the invention involves the use of communications network 10 in emulating a circuit type connection. Devices using a constant bit rate mode of communication frequently need to be treated as if there was a physical connection between the devices. Accordingly, ATM networks sometimes include resources to aid in emulating circuit connections so as to provide adequate service between devices communicating using a constant bit rate service. Communications network 10 of the present invention may be used in the emulation of circuit connections while guaranteeing certain network quality of service parameters. For each constant bit rate virtual connection, the present invention allows quality of service to be guaranteed for delay variation and end-to-end delay on a per virtual connection basis. In addition, bandwidth can be guaranteed for a constant bit rate virtual connection. Also, constant bit rate services may be transported through communications network 10 with no cell loss.

Although a more specific mechanism for implementing circuit connection emulation will be described in connection with FIG. 2 below, the above-described per virtual connection queuing mechanism may be used to emulate a circuit connection. For example, first computer 22 of FIG. 1 may desire to communicate using a constant bit rate service with second computer 24. To achieve circuit connection emulation, queues and bandwidth through each communications device 12 through which the virtual connection between computer 22 and computer 24 passes are allocated to the virtual connection for the duration of the communication signal between first computer 22 and second computer 24. The queue that is allocated has access to an allocated amount of buffer space for the duration of the connection. In this embodiment, allocated buffer space is implemented by assigning a counter limit to the queue. This counter limit represents the number of cell locations in a buffer pool that may be used by the particular queue at any one time. All queues that have allocated buffer space may use any available physical location in the shared pool up to the counter limit. In addition, an amount of output link bandwidth is allocated to the communications signal over each communications link 14 of communications network 10 over which the virtual connection travels between first computer 22 and second computer 24. By allocating network resources and dedicating those resources to a particular virtual connection, a circuit connection may be emulated through communications network 10 with quality of service guarantees on a per connection basis.

In this specific embodiment, communications device 12 has both an input queue and an output queue assigned to a constant bit rate virtual connection. These queues are created when a new virtual connection is established. In the current embodiment, 16,000 connections per input port or output port may be processed. In addition, bandwidth through the switching fabric of communications device 12 and bandwidth on the output link of communications device 12 are allocated to the constant bit rate virtual connection. Where communications device 12 is configured differently, circuit connections may be emulated by allocating any queuing and bandwidth resources on a per virtual connection basis in accordance with the invention.

FIG. 2 illustrates a first embodiment of a communications device 12 constructed in accordance with the teachings of the invention. FIG. 2 comprises a plurality of input ports 30 coupled to a switching fabric 32 which is, in turn, coupled to a plurality of output ports 34. The term "coupled" refers to a logical connection between the input ports 30, switching fabric 32 and output ports 34. Various additional circuitry may appear between these elements, but they are still logically coupled to one another. A larger or smaller number of input ports 30 and/or output ports 34 could be used without departing from the scope of the invention.

Each input port 30 is connected to one or more input links 36. Each input link 36 in turn comprises one or more virtual connections 38. Each output port 34 is connected to one or more output links 40. Each output link 40 in turn comprises one or more virtual connections 38.

Each input port 30 comprises one or more demultiplexers 42, one or more queues 44, and a multiplexer 50. Demultiplexers 42 and multiplexer 50 are not physical devices. Instead, the switching of traffic through input port 30 functionally implements demultiplexing and multiplexing functions.

When a virtual connection 38 is received over an input link 36 the cells associated with virtual connection 38 are demultiplexed through a demultiplexer 42 to one of the queues 44. In this embodiment, a unique queue 44 is assigned to each virtual connection 38. In other words, queue 44 contains the cells of one and only one input link 38. Although this embodiment employs per virtual connection queuing, the buffer and bandwidth mechanisms of the invention may be used in communications devices 12 that assign multiple virtual connections to a single queue 44.

In this embodiment, queue 44 comprises a linked list of pointers. These pointers point to the location in a buffer where a cell associated with a particular queue pointer is stored. A third aspect of the invention is the queuing mechanism used for queues 44. Each queue 44 may be associated with multiple buffer pools. In accordance with the queuing mechanism of this embodiment, queue 44 is associated with a particular virtual connection 38 and may be assigned dedicated buffer pool space, shared buffer pool space, or a combination of dedicated and shared buffer pool space depending upon the traffic type of the connection.

Referring to FIG. 2, one of the input queues 44 has been assigned space in shared buffer 46 and dedicated buffer 48. Space in dedicated buffer 48 is uniquely dedicated to a particular queue 44. Thus, space in dedicated buffer 48 associated with a queue 44 may be used by that queue 44 and only that queue 44. Space in shared buffer 46 is shared among several queues 44. Ordinarily, a constant bit rate virtual connection 38 will only be assigned space in a dedicated buffer 48, while a variable bit rate virtual connection 38 and available bit rate virtual connection 38, or an unspecified bit rate virtual connection 38 may be assigned dedicated space in a dedicated buffer 48 and shared space in a shared buffer 46. In this embodiment, because a particular virtual connection 38 is uniquely assigned a queue 44, space in a dedicated buffer 48 and/or in a shared buffer 46 may be assigned specifically to a virtual connection. In an embodiment where queue 44 is shared among several virtual connections 38, space in dedicated buffer 48 and/or shared buffer 46 may be assigned to the queue 44 as a whole.

Dedicated buffer 48 comprises a plurality of buffer locations 60 wherein each buffer location 60 holds one ATM cell.

The size of dedicated buffer 48 may be dynamically adjusted depending upon the number of virtual connections accessing dedicated buffer 48. When a queue 44 is assigned space in dedicated buffer 48, the queue 44 is assigned a fixed number of buffer locations 60 that the queue 44 may have access to at any one time. The specific physical position of those buffer locations 60 are not assigned to any specific queue 44. Rather, dedicated buffer 48 acts as a pool of buffer space. Any queue 44 that is assigned space in dedicated buffer 48 may use any otherwise unused physical location within it, as long as that queue 44 does not use more than the fixed number of buffer locations 60 that it is assigned. The queue 44 is guaranteed to have access to the fixed number of buffer locations 60 assigned to it at all times.

Similarly, shared buffer 46 acts as a pool of buffer space that can be shared in a similar manner to dedicated buffer 48. Each queue 44 is associated with a limit specifying the maximum number of locations in shared buffer 46 that the queue 44 may use at any one time. Here, however, each queue 44 is not guaranteed to have access to any fixed number of buffer locations 60. Instead, all queues 44 assigned space in shared buffer 46 share all buffer locations 60. When all of the buffer locations 60 in shared buffer 46 are in use, a queue 44 may not have access to another buffer location 60 even if it is not using the maximum number of buffer locations 60 that could be assigned to it. The size of shared buffer 46 may also be adjusted dynamically. A connection could be assigned to multiple shared buffers 46 or connections could be assigned to different shared buffers 46 based upon their traffic types.

Each of the queues 44 are connected to multiplexer 50. Multiplexer 50 controls the flow of cells between each input port 30 and switching fabric 32. As discussed above, multiplexer 50 is not a physical element, but is functionally implemented by the operation of input port 30.

In this embodiment, multiplexer 50 is used to assign bandwidth through switching fabric 32 to each of the queues 44 connected to multiplexer 50. This embodiment of the invention employs a unique bandwidth assignment method. A portion of the bandwidth through switching fabric 32 may be uniquely allocated to a particular queue 44 such that a fixed amount of bandwidth through switching fabric 32 is guaranteed to that queue 44. In addition, an amount of bandwidth through switching fabric 32 may be dynamically shared between two or more queues 44. Thus, an amount of uniquely allocated bandwidth through switching fabric 32 may be assigned to a particular queue 44. In addition, that particular queue 44 may or may not share in the available shared dynamic bandwidth through the switching fabric 32. In this embodiment, because queue 44 is associated with only one virtual connection, a bandwidth assignment is equivalent to assigning an amount of uniquely allocated bandwidth to a particular virtual connection. The same virtual connection may or may not share dynamic bandwidth. This aspect of the invention could also be used in a communications device 12 that assigned multiple virtual connections to a single queue 44. In such an embodiment, uniquely allocated bandwidth and/or shared dynamic bandwidth could be used by a queue 44.

Space in shared buffer 46 and/or dynamically shared bandwidth through switching fabric 32 may be shared by all queues 44 or may be divided into a series of pools shared by specific groups of the queues 44. For example, dynamic buffer space and/or bandwidth could be divided into pools associated with particular traffic types. Variable bit rate virtual connections, available bit rate virtual connections, and/or unspecified bit rate virtual connections could share buffer space and/or dynamic bandwidth in a pooled manner. A mechanism for achieving this type of sharing will be described more fully below.

If switching fabric 32 comprises a switching matrix, bandwidth and/or buffers in switching fabric 32 could be shared using the mechanisms described above wherein bandwidth and buffers may be either allocated or shared.

Each output port 34 comprises a demultiplexer 52, one or more queues 54, and one or more multiplexers 61. Each output port 34 is connected to one or more output links 40 and each output link 40 comprises one or more virtual connections 38. As was the case with input port 30, demultiplexer 52 and multiplexer 61 are not physical elements of output port 34, but are functionally implemented therein.

Demultiplexer 52 sends cells received from switching fabric 32 to the appropriate output queue 54. In this embodiment, each output queue 54 is associated with a unique virtual connection. In other words, each output queue 54 is used to queue the cells associated with one and only one virtual connection 38.

The queues 54 are similar to the queues 44. Each queue 54 may be associated with multiple buffer pools. As was the case with the queues 44 of input port 30, queues 54 of output port 34 comprise a linked list of pointers. Each pointer points to a cell location 60 in either a shared buffer 56 or dedicated buffer 58. Each queue 54 may be assigned an amount of uniquely dedicated space in a dedicated buffer 58 and/or an amount of shared space in a shared buffer 56. Accordingly, output queues 54 employ a buffering mechanism similar to that of input queues 44.

Each multiplexer 61 is connected to each of the output queues 54. As was the case with the multiplexer 50 and input port 30, the multiplexer 61 of output 34 are not physical elements of output 34, but output port 34 implements a multiplexing function. Each multiplexer 61 controls the access of the output queues 54 to bandwidth on its associated output link 40. Bandwidth on each output link 40 may be allocated as described above in connection with input port 30 for the input queues 44. Thus, each output queue 54 may be assigned an amount of uniquely allocated bandwidth which that particular output queue 54 is guaranteed to have access to if needed. That output queue 54 may also be assigned an amount of dynamically shared bandwidth that is shared among multiple output queues 54. Each output queue 54 may be assigned an amount of dynamic bandwidth, an amount of shared bandwidth, or a combination of both on a particular output link 40. In this embodiment, because each output queue 54 is only associated with a single virtual connection 38, this means that bandwidth may be allocated uniquely and/or dynamically shared on a per virtual connection basis. In an embodiment where an output queue 54 is shared among multiple virtual connections 38, bandwidth may be uniquely allocated or dynamically shared on a per queue basis using this mechanism.

As described above in connection with input port 30, space in a shared buffer 56 and/or dynamically shared bandwidth on an output link 40 may be shared among all virtual connections 30 or divided up and shared in pools corresponding to particular group of virtual connections such as traffic types. Again, this mechanism will be described more fully below.

Sometimes, a particular virtual connection 38 will be allocated more bandwidth through the switching fabric 32 than is needed by that virtual connection. In other words, the amount of allocated bandwidth through the switching fabric 32 may be uniquely allocated to a virtual connection having a bandwidth smaller than the amount of allocated bandwidth. Allocating additional bandwidth reduces delay through communications device 12. In the present invention, bandwidth that is allocated to a particular virtual connection 38 through the switching fabric 32 that is unused by that particular virtual connection 38 becomes part of the switch's dynamic bandwidth. This dynamic bandwidth is shared between virtual connections using dynamic bandwidth services. This feature of the invention allows more efficient use of the resources of communications network 10.

Access to shared buffer space may also be prioritized. Each virtual connection may have a priority assigned to it. Each buffer pool has priority thresholds. As the available buffers in the buffer pool decrease below the thresholds, virtual connections with corresponding priorities are denied further access to the buffer pool.

As described above, connections can have access to shared buffers and bandwidth. Levels of control can be added to manage both the order and the amount of the shared resources that connections can use. The highest level of control is to ensure that traffic types receive a guaranteed minimum assignment of the shared resource. This is accomplished at the output link by measuring bandwidth usage per traffic type, and granting each traffic type bandwidth until it has received the desired minimum amount. For buffers, this is accomplished by having a buffer pool per traffic type. The order in which the traffic types receive bandwidth could be a programmable policy. In this embodiment, the order is fixed. Quality of service levels can be determined for connections sharing the minimum bandwidth and buffer guarantee for a traffic type, assuming that the connections' input characteristics can be accurately described. In this embodiment, the connections of the same traffic type are multiplexed together using a linked list data structure at both bandwidth contention points—i.e. the switch port and link. This multiplexing point is given the minimum bandwidth guarantee. An identifier in the connection's queue descriptor (s) is used to associate the connections with a multiplexing point.

Access to the traffic type's shared resources is also ordered. That is, connections within a traffic type get access to bandwidth and buffers using a priority mechanism. Again, this prioritization occurs at the resource contention points, so that there are traffic type priorities at both the input port processor and the output port processor. Input buffer pools have one or more thresholds, above which certain connections within a traffic type are denied buffers. There are one or more multiplexers, i.e. lists, per traffic type, where the multiplexers are assigned, in priority order, bandwidth granted to the traffic type at the output port. This means that low priority connections get bandwidth only after the high priority connections do not have any data to transmit. An identifier in the connection's queue descriptor(s) is used to associate the connections with a priority.

Note that more levels of access control to shared resources can be added in the switch. For example, the lowest level of control occurs on a multipoint-to-point connection. Bandwidth is distributed to the multiple sources of a single multipoint-to-point connection by the use of two additional multiplexers: (1) a list of queues at the input port that distributes the bandwidth between multiple sources merging at the input port, and (2) an arbitration mechanism in the switch fabric that distributes bandwidth between sources on multiple input ports.

Although the present invention has been described in detail, it should be understood that various changes, substitutions, and alterations can be made hereto without departing from the spirit and scope of the invention as defined by the appended claims.

What is claimed is:

1. A method for emulating a circuit connection in a cell based communications network, comprising:

establishing a virtual connection from a source connected to the communications network to an input port of a first node in the communications network and therethrouqh, to a destination node in the communications network, wherein the virtual connection is for conveying a series of data cells comprising a header portion and a data portion;

transporting cells of the virtual connection across at least one communications link connecting an output port of the first node to the destination node in the communications network wherein said output port includes a first queue;

dedicating a first queue of the input port, only to the virtual connection at the first node wherein the first queue comprises a first amount of buffer space;

allocating a first amount of link bandwidth, only to the virtual connection, on each communications link associated with the virtual connection, the first amount of link bandwidth being defined by dedicating the first queue of the first node output port only to the virtual connection; and transmitting cells of the virtual connection from said output port of the first node over the virtual connection for receipt at a destination node of the communications network.

2. The method of claim 1, further comprising:

allocating, within a first node switching fabric intermediate the first node input and output ports, an amount of switching fabric bandwidth to the virtual connection at the first node in the communications network through which the virtual connection passes, wherein the first node comprises a switching fabric coupled to the at least one communications link, and wherein the amount of switching fabric bandwidth is allocated only to the virtual connection.

3. The method of claim 2, wherein the data cells comprise asynchronous transfer mode cells.

4. The method of claim 2, wherein the amount of switching fabric bandwidth exceeds the bandwidth of the virtual connection and wherein the amount of bandwidth in the amount of switching fabric bandwidth exceeding the bandwidth of the virtual connection may be used by other virtual connections in the communications network.

5. The method of claim 2, wherein the virtual connection comprises a constant bit rate connection.

6. A communications device for emulating a circuit connection in a cell based communications network, comprising:

an input link connected to the communications network via an input port and operable to receive a series of cells of a virtual connection wherein the series of data cells comprises a header portion and a data portion;

a first queue, associated with the input port, dedicated only to the virtual connection, the first queue dedicated for the duration of the virtual connection, wherein the first queue comprises a first amount of buffer space;

an output link coupled to the input link wherein a first amount of output link bandwidth is allocated only to the virtual connection, the first amount of output link bandwidth allocated for the duration of the virtual connection; and a second queue associated with an output port, wherein the second queue comprises a second amount of buffer space, wherein the output link is coupled to the input link via the input Queue and the output queue, wherein the first amount of output link bandwidth is defined by the second queue, dedicated only to the virtual connection and for the duration of the virtual connection.

7. The communications device of claim 6, further comprising:

a switching fabric coupled between the input port and the output port, wherein an amount of switching fabric bandwidth is allocated only to the virtual connection, wherein the amount of switching fabric bandwidth is allocated for the duration of the virtual connection.

8. The communications device of claim 7, wherein the data cells comprise asynchronous transfer mode cells.

9. A cell based communications network operable to emulate a circuit connection comprising:

a source device coupled to a communications network and operable to generate a series of cells of a virtual connection wherein the series of data cells comprises a header portion and a data portion and wherein the virtual connection is to be established between the source device and a destination device;

the destination device connected to the communications network and operable to receive the series of cells of the virtual connection;

at least one node and plural links coupling the source device to the destination device, the at least one node and plural links operable to emulate a circuit connection as the virtual connection between the source device and the destination device; and wherein each node in the path of the circuit connection comprises a communications device, each communications device further comprising:

an input link comprising one of the links of the communications network and operable to receive the series of cells of the virtual connection.

an input port in communication with the input link;

a first queue associated with the input port and dedicated only to the virtual connection, the first queue dedicated for the duration of the virtual connection, and wherein the first queue comprises a first amount of buffer space, an output link comprising one of the links of the communications network and coupled to the input link via the input sort wherein a first amount of output link bandwidth is allocated only to the virtual connection, the first amount of output link bandwidth allocated for the duration of the virtual connection; and a second queue associated with an output port intermediate the input port and the output link, the first amount of link bandwidth being defined by dedicating the output queue only to the virtual connection for the duration of the virtual connection.

10. The cell based communications network of claim 9, wherein the communications device further comprises:

a switching fabric coupled between the input port and the output port, wherein an amount of switching fabric bandwidth is allocated only to the virtual connection, wherein the second amount of switching fabric bandwidth is allocated for the duration of the virtual connection.

11. The cell based communications network of claim 9, wherein the data cells comprise asynchronous transfer mode cells.

* * * * *

UNITED STATES PATENT AND TRADEMARK OFFICE
CERTIFICATE OF CORRECTION

PATENT NO. : 5,787,086

DATED : July 28, 1998

INVENTOR(S) : Robert B. McClure, et al.

It is certified that error appears in the above-identified patent and that said Letters Patent is hereby corrected as shown below:

U.S. PATENT DOCUMENTS

| DOCUMENT NUMBER | | | | | | | DATE | NAME | CLASS | SUBCLASS |
|---|---|---|---|---|---|---|---|---|---|---|
| 5 | 0 | 1 | 4 | 1 | 9 | 2 | 5/7/91 | Mansfield et al. | 364 | 200 |
| 4 | 9 | 4 | 2 | 5 | 7 | 4 | 7/17/90 | Zelle | 370 | 85.15 |
| 4 | 8 | 9 | 7 | 8 | 3 | 3 | 1/30/90 | Kent et al. | 370 | 85.2 |
| 4 | 8 | 7 | 2 | 1 | 9 | 7 | 10/3/89 | Pemmaraju | 379 | 93 |
| 4 | 8 | 7 | 2 | 1 | 5 | 7 | 10/3/89 | Hemmady et al. | 370 | 60 |
| 4 | 8 | 7 | 0 | 6 | 4 | 1 | 9/26/89 | Pattavina | 370 | 60 |
| 4 | 7 | 4 | 8 | 6 | 5 | 8 | 5/31/88 | Gopal et al. | 379 | 221 |
| 4 | 2 | 4 | 0 | 1 | 4 | 3 | 12/16/80 | Bessemer et al. | 364 | 200 |
| 4 | 0 | 8 | 4 | 2 | 2 | 8 | 4/11/78 | Dufond et al. | 364 | 200 |
| 5 | 4 | 9 | 7 | 3 | 6 | 9 | 3/5/96 | Wainwright | 370 | 60 |
| 5 | 3 | 0 | 1 | 0 | 5 | 5 | 4/5/94 | Bagchi et al. | 359 | 139 |
| 5 | 4 | 6 | 5 | 3 | 6 | 5 | 11/7/95 | Winterbottom | 395 | 600 |
| 5 | 4 | 6 | 3 | 7 | 7 | 5 | 10/31/95 | DeWitt et al. | 395 | 184.01 |
| 5 | 4 | 6 | 9 | 0 | 0 | 3 | 11/21/95 | Kean | 326 | 39 |
| 5 | 4 | 6 | 3 | 6 | 2 | 9 | 10/31/95 | Ko | 370 | 110.1 |
| 5 | 4 | 5 | 4 | 2 | 9 | 9 | 9/19/95 | Thessin et al. | 370 | 62 |
| 5 | 4 | 4 | 8 | 6 | 2 | 1 | 9/5/95 | Knudsen | 379 | 58 |
| 5 | 4 | 2 | 6 | 6 | 3 | 5 | 6/20/95 | Mitra et al. | 370 | 60 |
| 5 | 4 | 1 | 8 | 9 | 4 | 2 | 5/23/95 | Krawchuk et al. | 395 | 600 |

UNITED STATES PATENT AND TRADEMARK OFFICE
CERTIFICATE OF CORRECTION

PATENT NO. : 5,787,086

DATED : July 28, 1998

INVENTOR(S) : Robert B. McClure, et al.

It is certified that error appears in the above-identified patent and that said Letters Patent is hereby corrected as shown below:

U.S. PATENT DOCUMENTS

| DOCUMENT NUMBER | | | | | | | DATE | NAME | CLASS | SUBCLASS |
|---|---|---|---|---|---|---|---|---|---|---|
| 5 | 0 | 2 | 1 | 9 | 4 | 9 | 6/4/91 | Morten et al. | 364 | 200 |
| 4 | 9 | 7 | 9 | 1 | 0 | 0 | 12/18/90 | Makris et al. | 364 | 200 |
| 4 | 9 | 5 | 8 | 3 | 4 | 1 | 9/18/90 | Hemmady et al. | 370 | 60.1 |
| 4 | 9 | 5 | 6 | 8 | 3 | 9 | 9/11/90 | Torii et al. | 370 | 60 |
| 4 | 8 | 9 | 9 | 3 | 3 | 3 | 2/6/90 | Roediger | 370 | 60 |
| 4 | 8 | 9 | 4 | 8 | 2 | 4 | 1/16/90 | Hemmady et al. | 370 | 58.3 |
| 4 | 8 | 9 | 3 | 3 | 0 | 7 | 1/9/90 | McKay et al. | 370 | 94.1 |
| 4 | 8 | 9 | 3 | 3 | 0 | 2 | 1/9/90 | Hemmady et al. | 370 | 60 |
| 4 | 8 | 7 | 2 | 1 | 6 | 0 | 10/3/89 | Hemmady et al. | 370 | 60 |
| 4 | 8 | 7 | 2 | 1 | 5 | 9 | 10/3/89 | Hemmady et al. | 370 | 60 |
| 4 | 0 | 6 | 9 | 3 | 9 | 9 | 1/17/78 | Barrett et al. | 179 | 15 AL |
| 3 | 8 | 0 | 4 | 9 | 9 | 1 | 4/16/74 | Hammond et al. | 179 | 26 |
| 5 | 4 | 4 | 4 | 7 | 0 | 2 | 8/22/95 | Burnett et al. | 370 | 60.1 |
| 5 | 3 | 1 | 3 | 4 | 5 | 4 | 5/17/94 | Bustini et al. | 370 | 13 |
| 5 | 2 | 8 | 9 | 4 | 6 | 2 | 2/22/94 | Ahmadi et al. | 370 | 60.1 |
| 5 | 1 | 9 | 9 | 0 | 2 | 7 | 3/30/93 | Barri | 370 | 60 |
| 5 | 1 | 5 | 0 | 3 | 5 | 8 | 9/22/92 | Punj et al. | 370 | 84 |
| 4 | 8 | 4 | 9 | 9 | 6 | 8 | 7/18/89 | Turner | 370 | 94 |
| 5 | 4 | 7 | 3 | 6 | 0 | 8 | 12/5/95 | Gagne et al. | 370 | 85.13 |

UNITED STATES PATENT AND TRADEMARK OFFICE
CERTIFICATE OF CORRECTION

PATENT NO. : 5,787,086

DATED : July 28, 1998

INVENTOR(S) : Robert B. McClure, et al.

It is certified that error appears in the above-identified patent and that said Letters Patent is hereby corrected as shown below:

U.S. PATENT DOCUMENTS

| DOCUMENT NUMBER | | | | | | | DATE | NAME | CLASS | SUBCLASS |
|---|---|---|---|---|---|---|---|---|---|---|
| 5 | 5 | 3 | 3 | 0 | 2 | 0 | 7/2/96 | Byrn et al. | 370 | 60.1 |
| 5 | 5 | 2 | 1 | 9 | 2 | 3 | 5/28/96 | Willmann et al. | 370 | 94.1 |
| 5 | 5 | 1 | 9 | 6 | 9 | 0 | 5/21/96 | Suzuka et al. | 370 | 17 |
| 5 | 5 | 1 | 5 | 3 | 5 | 9 | 5/7/96 | Zheng | 370 | 13 |
| 5 | 5 | 1 | 3 | 1 | 3 | 4 | 4/30/96 | Cooperman et al. | 365 | 49 |
| 5 | 4 | 9 | 3 | 5 | 6 | 6 | 2/20/96 | Ljungberg et al. | 370 | 60 |
| 5 | 4 | 5 | 5 | 8 | 2 | 5 | 10/3/95 | Lauer et al. | 370 | 60 |
| 5 | 4 | 4 | 6 | 7 | 3 | 8 | 8/29/95 | Kim et al. | 370 | 94.2 |
| 5 | 4 | 4 | 0 | 5 | 4 | 7 | 8/8/95 | Easki et al. | 370 | 60 |
| 5 | 4 | 1 | 2 | 6 | 4 | 8 | 5/2/95 | Fan | 370 | 60 |
| 5 | 2 | 9 | 1 | 4 | 8 | 2 | 3/1/94 | McHarg et al. | 370 | 60 |
| 5 | 3 | 6 | 9 | 5 | 7 | 0 | 11/29/94 | Parad | 364 | 401 |
| 5 | 3 | 6 | 3 | 4 | 9 | 7 | 11/8/94 | Baker et al. | 395 | 425 |
| 5 | 3 | 4 | 1 | 4 | 8 | 3 | 8/23/94 | Frank et al. | 395 | 400 |
| 5 | 0 | 9 | 3 | 8 | 2 | 7 | 3/3/92 | Franklin et al. | 370 | 60.1 |

UNITED STATES PATENT AND TRADEMARK OFFICE
CERTIFICATE OF CORRECTION

PATENT NO. : 5,787,086

DATED : July 28, 1998

INVENTOR(S) : Robert B. McClure, et al.

It is certified that error appears in the above-identified patent and that said Letters Patent is hereby corrected as shown below:

U.S. PATENT DOCUMENTS

| DOCUMENT NUMBER | | | | | | | DATE | NAME | CLASS | SUBCLASS |
|---|---|---|---|---|---|---|---|---|---|---|
| 5 | 4 | 5 | 0 | 4 | 0 | 6 | 9/12/95 | Esaki et al. | 370 | 60.1 |
| 5 | 4 | 4 | 6 | 7 | 3 | 8 | 8/29/95 | Kim et al. | 370 | 94.2 |
| 5 | 4 | 4 | 0 | 5 | 4 | 7 | 8/8/95 | Easki et al. | 370 | 60 |
| 5 | 3 | 7 | 7 | 2 | 6 | 2 | 12/27/94 | Bales et al. | 379 | 220 |
| 5 | 3 | 7 | 1 | 8 | 9 | 3 | 12/6/94 | Price et al. | 395 | 725 |
| 5 | 3 | 4 | 5 | 2 | 2 | 9 | 9/6/94 | Olnowich et al. | 340 | 825.8 |
| 5 | 3 | 1 | 1 | 5 | 8 | 6 | 5/10/94 | Bogart et al. | 379 | 221 |
| 5 | 2 | 8 | 2 | 2 | 0 | 1 | 1/25/94 | Frank et al. | 370 | 94.1 |
| 5 | 2 | 7 | 2 | 6 | 9 | 7 | 12/21/93 | Fraser et al. | 370 | 61 |
| 5 | 1 | 9 | 1 | 6 | 5 | 2 | 3/2/93 | Dias et al. | 395 | 200 |
| 5 | 1 | 2 | 8 | 9 | 3 | 2 | 7/7/92 | Li | 370 | 60 |
| 5 | 0 | 8 | 4 | 8 | 7 | 1 | 1/28/92 | Carn et al. | 370 | 94.1 |
| 5 | 1 | 9 | 1 | 5 | 8 | 2 | 3/2/93 | Upp | 370 | 94.1 |
| 5 | 1 | 7 | 9 | 5 | 5 | 8 | 1/12/93 | Thacker et al. | 370 | 94.3 |
| 5 | 1 | 1 | 9 | 3 | 7 | 2 | 6/2/92 | Verbeek | 370 | 85.3 |
| 5 | 0 | 9 | 0 | 0 | 1 | 1 | 2/18/92 | Fukuta et al. | 370 | 60 |
| 4 | 7 | 2 | 7 | 5 | 3 | 7 | 2/23/88 | Nichols | 370 | 85 |
| 5 | 4 | 8 | 5 | 4 | 5 | 5 | 1/16/96 | Dobbins et al. | 370 | 60 |

UNITED STATES PATENT AND TRADEMARK OFFICE
CERTIFICATE OF CORRECTION

PATENT NO. : 5,787,086

DATED : July 28, 1998

INVENTOR(S) : Robert B. McClure, et al.

It is certified that error appears in the above-identified patent and that said Letters Patent is hereby corrected as shown below:

U.S. PATENT DOCUMENTS

| DOCUMENT NUMBER | | | | | | | DATE | NAME | CLASS | SUBCLASS |
|---|---|---|---|---|---|---|---|---|---|---|
| 5 | 5 | 2 | 6 | 3 | 4 | 4 | 6/11/96 | Diaz et al. | 370 | 16 |
| 5 | 5 | 2 | 4 | 1 | 1 | 3 | 6/4/96 | Gaddis | 370 | 60.1 |
| 5 | 5 | 2 | 1 | 9 | 1 | 6 | 5/28/96 | Choudhury et al. | 370 | 60.1 |
| 5 | 5 | 2 | 1 | 9 | 1 | 5 | 5/28/96 | Dieudonne et al. | 370 | 60.1 |
| 5 | 5 | 2 | 1 | 9 | 0 | 5 | 5/28/96 | Oda et al. | 370 | 17 |
| 5 | 5 | 0 | 6 | 9 | 5 | 6 | 4/9/96 | Cohen | 395 | 182.04 |
| 5 | 5 | 0 | 4 | 7 | 4 | 1 | 4/2/96 | Yamanaka et al. | 370 | 58.2 |
| 5 | 4 | 9 | 9 | 2 | 3 | 8 | 3/12/96 | Shon | 370 | 60.2 |
| 5 | 4 | 9 | 1 | 6 | 9 | 4 | 2/13/96 | Oliver et al. | 370 | 85.4 |
| 5 | 4 | 9 | 1 | 6 | 9 | 1 | 2/13/96 | Shtayer et al. | 370 | 61 |
| 5 | 4 | 8 | 8 | 6 | 0 | 6 | 1/30/96 | Kakuma et al. | 370 | 16 |
| 5 | 4 | 8 | 5 | 4 | 5 | 3 | 1/16/96 | Wahlman et al. | 370 | 16 |
| 5 | 4 | 8 | 3 | 5 | 2 | 6 | 1/9/96 | Ben-Nun et al. | 370 | 60.1 |
| 5 | 4 | 7 | 9 | 4 | 0 | 1 | 12/26/95 | Bitz et al. | 370 | 60.1 |
| 5 | 4 | 7 | 5 | 6 | 7 | 9 | 12/12/95 | Munter | 370 | 58.2 |
| 5 | 4 | 6 | 5 | 3 | 3 | 1 | 11/7/95 | Yang et al. | 395 | 200. |
| 5 | 4 | 6 | 1 | 6 | 1 | 1 | 10/24/95 | Drake Jr. et al. | 370 | 54 |
| 5 | 4 | 5 | 5 | 8 | 2 | 0 | 10/3/95 | Yamada | 370 | 17 |
| 5 | 4 | 4 | 8 | 5 | 5 | 9 | 9/5/95 | Hayter et al. | 370 | 60.1 |
| 5 | 4 | 4 | 6 | 7 | 3 | 7 | 8/29/95 | Cidon et al. | 370 | 85.5 |
| 5 | 4 | 3 | 6 | 8 | 9 | 3 | 7/25/95 | Barnett | 370 | 60.1 |

UNITED STATES PATENT AND TRADEMARK OFFICE
CERTIFICATE OF CORRECTION

PATENT NO. : 5,787,086

DATED : July 28, 1998

INVENTOR(S) : Robert B. McClure, et al.

It is certified that error appears in the above-identified patent and that said Letters Patent is hereby corrected as shown below:

U.S. PATENT DOCUMENTS

| DOCUMENT NUMBER | DATE | NAME | CLASS | SUBCLASS |
|---|---|---|---|---|
| 5 5 5 7 6 0 7 | 9/17/96 | Holden | 370 | 58.2 |
| 5 5 5 3 0 6 8 | 9/3/96 | Aso et al. | 370 | 60 |
| 5 5 4 6 3 9 2 | 8/13/96 | Boal et al. | 370 | 60.1 |
| 5 5 4 6 3 9 1 | 8/13/96 | Hochschild et al. | 370 | 60 |
| 5 5 4 6 3 8 9 | 8/13/96 | Wippenbeck et al. | 370 | 60 |
| 5 5 4 4 1 6 8 | 8/6/96 | Jeffrey et al. | 370 | 60.1 |
| 5 5 4 1 9 1 2 | 7/30/96 | Choudhury et al. | 370 | 17 |
| 5 5 3 5 1 9 7 | 7/9/96 | Cotton | 370 | 60 |
| 5 5 3 3 0 0 9 | 7/2/96 | Chen | 370 | 17 |
| 5 5 3 0 6 9 5 | 6/25/96 | Digne et al. | 370 | 17.000 |
| 5 5 2 8 5 8 8 | 6/18/96 | Bennett et al. | 370 | 60 |
| 5 4 3 6 8 8 6 | 7/25/95 | McGill | 370 | 16 |
| 5 4 3 2 9 0 8 | 7/11/95 | Heddes et al. | 395 | 250 |
| 5 4 2 5 0 2 6 | 7/13/95 | Mori | 370 | 60 |
| 5 4 2 5 0 2 1 | 7/13/95 | Derby et al. | 370 | 54 |
| 5 4 2 2 8 7 9 | 6/6/95 | Parsons et al. | 370 | 60 |
| 5 4 2 0 9 8 8 | 5/30/95 | Elliott | 395 | 275 |
| 5 4 2 0 8 5 8 | 5/30/95 | Marshall et al. | 370 | 60.1 |
| 5 4 1 4 7 0 3 | 5/9/95 | Sakaue et al. | 370 | 60 |
| 5 4 0 2 4 1 5 | 3/28/95 | Turner | 370 | 60 |

UNITED STATES PATENT AND TRADEMARK OFFICE
CERTIFICATE OF CORRECTION

PATENT NO. : 5,787,086

DATED : July 28, 1998

INVENTOR(S) : Robert B. McClure, et al.

It is certified that error appears in the above-identified patent and that said Letters Patent is hereby corrected as shown below:

U.S. PATENT DOCUMENTS

| DOCUMENT NUMBER | | | | | | | DATE | NAME | CLASS | SUBCLASS |
|---|---|---|---|---|---|---|---|---|---|---|
| 5 | 3 | 9 | 0 | 1 | 7 | 4 | 2/14/95 | Jugel | 370 | 60 |
| 5 | 3 | 7 | 9 | 4 | 1 | 8 | 1/3/95 | Shimazaki et al. | 395 | 575 |
| 5 | 3 | 6 | 1 | 3 | 7 | 2 | 11/1/94 | Rege et al. | 395 | 800 |
| 5 | 3 | 5 | 5 | 3 | 7 | 2 | 10/11/94 | Sengupta et al. | 370 | 60 |
| 5 | 3 | 4 | 1 | 3 | 7 | 6 | 8/23/94 | Yamashita | 370 | 99 |
| 5 | 3 | 3 | 9 | 3 | 1 | 0 | 8/16/94 | Taniguchi | 370 | 60 |
| 5 | 3 | 2 | 3 | 3 | 8 | 9 | 6/21/94 | Bitz et al. | 370 | 60.1 |
| 5 | 3 | 2 | 1 | 6 | 9 | 5 | 4/12/94 | Proctor et al. | 370 | 60 |
| 5 | 3 | 0 | 3 | 2 | 3 | 2 | 6/14/94 | Faulk Jr. | 370 | 94 |
| 5 | 3 | 0 | 1 | 1 | 8 | 4 | 4/5/94 | Uriu et al. | 370 | 60 |
| 5 | 2 | 8 | 9 | 4 | 7 | 0 | 2/22/94 | Chang et al. | 370 | 94.1 |
| 5 | 1 | 9 | 8 | 8 | 0 | 8 | 3/30/93 | Kudo | 340 | 825.8 |
| 5 | 1 | 7 | 9 | 5 | 5 | 6 | 1/12/93 | Turner | 370 | 94.1 |
| 5 | 1 | 4 | 6 | 4 | 7 | 4 | 9/8/92 | Nagler et al. | 375 | 10 |
| 5 | 1 | 3 | 0 | 9 | 8 | 2 | 7/14/92 | Ash et al. | 370 | 85.7 |
| 5 | 0 | 9 | 3 | 9 | 1 | 2 | 3/3/92 | Dong et al. | 395 | 650 |
| 5 | 0 | 8 | 3 | 2 | 6 | 9 | 1/21/92 | Syobatake et al. | 395 | 425 |
| 4 | 9 | 5 | 3 | 1 | 5 | 7 | 8/28/90 | Franklin et al. | 370 | 60 |
| 4 | 8 | 2 | 1 | 0 | 3 | 4 | 4/11/89 | Anderson et al. | 340 | 825.800 |
| 4 | 6 | 0 | 3 | 3 | 8 | 2 | 7/29/86 | Cole et al. | 364 | 200 |

UNITED STATES PATENT AND TRADEMARK OFFICE
CERTIFICATE OF CORRECTION

PATENT NO. : 5,787,086

DATED : July 28, 1998

INVENTOR(S) : Robert B. McClure, et al.

It is certified that error appears in the above-identified patent and that said Letters Patent is hereby corrected as shown below:

U.S. PATENT DOCUMENTS

| DOCUMENT NUMBER | | | | | | DATE | NAME | CLASS | SUBCLASS |
|---|---|---|---|---|---|---|---|---|---|
| 4 | 9 | 3 | 3 | 9 | 3 | 8 | 6/12/90 | Sheehy | 370 | 85.13 |
| 4 | 9 | 2 | 2 | 5 | 0 | 3 | 5/1/90 | Leone | 370 | 85.13 |
| 4 | 8 | 9 | 7 | 8 | 4 | 1 | 1/30/90 | Gang, Jr. | 370 | 85.13 |
| 4 | 7 | 9 | 7 | 8 | 8 | 1 | 1/10/89 | Ben-Artzi | 370 | 88 |
| 4 | 7 | 3 | 7 | 9 | 5 | 3 | 4/12/88 | Koch et al. | 370 | 94 |
| 4 | 7 | 1 | 5 | 0 | 3 | 0 | 12/22/87 | Koch et al. | 370 | 85 |
| 5 | 3 | 9 | 0 | 11 | 7 | 5 | 2/14/95 | Hiller et al. | 370 | 60 |
| 5 | 3 | 9 | 0 | 1 | 7 | 0 | 2/14/95 | Sawant et al. | 370 | 58.1 |
| 5 | 3 | 7 | 7 | 3 | 2 | 7 | 12/27/94 | Jain et al. | 395 | 200 |
| 5 | 3 | 7 | 3 | 5 | 0 | 4 | 12/13/94 | Tanaka et al. | 370 | 60.1 |
| 5 | 3 | 5 | 9 | 6 | 0 | 0 | 10/25/94 | Ueda et al. | 370 | 60.1 |
| 5 | 3 | 6 | 5 | 5 | 1 | 4 | 11/14/94 | Hershey et al. | 370 | 17 |
| 5 | 3 | 5 | 7 | 5 | 0 | 8 | 10/18/94 | Le Boudec et al. | 370 | 58.3 |
| 5 | 3 | 5 | 7 | 5 | 0 | 7 | 10/18/94 | Hughes et al. | 370 | 60 |
| 5 | 3 | 5 | 7 | 5 | 0 | 6 | 10/18/94 | Sugawara | 370 | 60 |
| 5 | 3 | 9 | 8 | 2 | 3 | 5 | 3/14/95 | Tsuzuki et al. | 370 | 16 |
| 5 | 3 | 9 | 4 | 3 | 9 | 6 | 2/28/95 | Yoshimura et al. | 370 | 60 |
| 5 | 3 | 9 | 2 | 4 | 0 | 2 | 2/21/95 | Robrock II | 395 | 200 |
| 5 | 3 | 9 | 2 | 2 | 8 | 0 | 2/21/95 | Zheng | 370 | 60 |

UNITED STATES PATENT AND TRADEMARK OFFICE
CERTIFICATE OF CORRECTION

PATENT NO. : 5,787,086
DATED : July 28, 1998
INVENTOR(S) : Robert B. McClure, et al.

It is certified that error appears in the above-identified patent and that said Letters Patent is hereby corrected as shown below:

U.S. PATENT DOCUMENTS

| DOCUMENT NUMBER | | | | | | | DATE | NAME | CLASS | SUBCLASS |
|---|---|---|---|---|---|---|---|---|---|---|
| 5 | 3 | 5 | 0 | 9 | 0 | 6 | 9/27/94 | Brody et al. | 235 | 379 |
| 5 | 3 | 4 | 1 | 3 | 7 | 3 | 8/23/94 | Ishibashi et al. | 370 | 85.9 |
| 5 | 3 | 4 | 1 | 3 | 6 | 6 | 8/23/94 | Soumiya et al. | 370 | 17 |
| 5 | 3 | 3 | 9 | 3 | 1 | 8 | 8/16/94 | Tanaka et al. | 370 | 110.1 |
| 5 | 3 | 3 | 9 | 3 | 1 | 7 | 8/16/94 | Tanaka et al. | 370 | 85.15 |
| 5 | 3 | 3 | 5 | 3 | 2 | 5 | 8/2/94 | Frank et al. | 395 | 200 |
| 5 | 3 | 3 | 3 | 1 | 3 | 4 | 7/26/94 | Ishibashi et al. | 370 | 94.1 |
| 5 | 3 | 3 | 3 | 1 | 3 | 1 | 7/26/94 | Tanabe et al. | 370 | 54 |
| 5 | 3 | 1 | 9 | 6 | 3 | 8 | 6/7/94 | Lin | 370 | 60 |
| 5 | 3 | 1 | 5 | 5 | 8 | 6 | 5/24/94 | Charvillat | 370 | 60 |
| 5 | 3 | 0 | 9 | 4 | 3 | 8 | 5/3/94 | Nakajima | 370 | 94.1 |
| 5 | 2 | 8 | 9 | 4 | 6 | 3 | 2/22/94 | Mobasser | 370 | 68.1 |
| 5 | 2 | 8 | 5 | 4 | 4 | 6 | 2/8/94 | Yonehara | 370 | 60.1 |
| 5 | 2 | 8 | 0 | 4 | 7 | 0 | 1/18/94 | Buhrke et al. | 370 | 13 |
| 5 | 2 | 7 | 4 | 7 | 6 | 8 | 12/28/93 | Traw et al. | 395 | 275 |
| 5 | 2 | 7 | 4 | 6 | 4 | 1 | 12/28/93 | Shobatake et al. | 370 | 94.1 |
| 5 | 2 | 6 | 7 | 2 | 3 | 2 | 11/30/93 | Katsube et al. | 370 | 17 |
| 5 | 2 | 5 | 8 | 9 | 7 | 9 | 11/2/93 | Oomuro et al. | 370 | 95.1 |
| 5 | 2 | 5 | 5 | 2 | 6 | 6 | 10/19/93 | Watanabe et al. | 370 | 60.1 |

UNITED STATES PATENT AND TRADEMARK OFFICE
CERTIFICATE OF CORRECTION

PATENT NO. : 5,787,086

DATED : July 28, 1998

INVENTOR(S) : Robert B. McClure, et al.

It is certified that error appears in the above-identified patent and that said Letters Patent is hereby corrected as shown below:

U.S. PATENT DOCUMENTS

| DOCUMENT NUMBER | | | | | | | DATE | NAME | CLASS | SUBCLASS |
|---|---|---|---|---|---|---|---|---|---|---|
| 5 | 2 | 5 | 3 | 2 | 4 | 8 | 10/12/93 | Dravida et al. | 370 | 16 |
| 5 | 2 | 5 | 3 | 2 | 4 | 7 | 10/12/93 | Hirose et al. | 370 | 14 |
| 5 | 2 | 3 | 9 | 5 | 3 | 9 | 8/24/93 | Uchida et al. | 370 | 58.3 |
| 5 | 1 | 9 | 3 | 1 | 5 | 1 | 3/9/93 | Jain | 395 | 200 |
| 5 | 1 | 6 | 3 | 0 | 4 | 5 | 11/10/92 | Caram et al. | 370 | 60.1 |
| 5 | 1 | 5 | 7 | 6 | 5 | 7 | 10/20/92 | Potter et al. | 370 | 85 |
| 5 | 1 | 3 | 2 | 9 | 6 | 6 | 7/21/92 | Hayano et al. | 370 | 79 |
| 5 | 1 | 3 | 0 | 9 | 7 | 5 | 7/14/92 | Akata | 370 | 60 |
| 5 | 1 | 1 | 5 | 4 | 2 | 9 | 5/19/92 | Hluchyj et al. | 370 | 84 |
| 5 | 0 | 9 | 0 | 0 | 2 | 4 | 2/18/92 | Vander Mey et al. | 375 | 1 |
| 5 | 0 | 7 | 0 | 4 | 9 | 8 | 12/3/91 | Kakuma et al. | 370 | 60 |
| 5 | 0 | 6 | 7 | 1 | 2 | 3 | 11/19/91 | Hyodo et al. | 370 | 58.1 |
| 5 | 0 | 2 | 9 | 1 | 6 | 4 | 7/2/91 | Goldstein et al. | 370 | 95.1 |

UNITED STATES PATENT AND TRADEMARK OFFICE
CERTIFICATE OF CORRECTION

PATENT NO. : 5,787,086

DATED : July 28, 1998

INVENTOR(S) : Robert B. McClure, et al.

It is certified that error appears in the above-identified patent and that said Letters Patent is hereby corrected as shown below:

U.S. PATENT DOCUMENTS

| DOCUMENT NUMBER | | | | | | | DATE | NAME | CLASS | SUBCLASS |
|---|---|---|---|---|---|---|---|---|---|---|
| 3 | 9 | 7 | 4 | 3 | 4 | 3 | 8/10/76 | Cheney et al. | 179 | 18ES |
| 5 | 5 | 7 | 7 | 0 | 3 | 5 | 11/19/96 | Hayter et al. | 370 | 60 |
| 5 | 4 | 3 | 2 | 7 | 8 | 4 | 7/11/95 | Ozveren | 370 | 79 |
| 5 | 5 | 2 | 8 | 5 | 9 | 1 | 6/18/96 | Lauer | 370 | 79 |
| 5 | 4 | 3 | 2 | 7 | 8 | 5 | 7/11/95 | Ahmed et al. | 370 | 79 |
| 5 | 2 | 9 | 1 | 4 | 8 | 1 | 3/1/94 | Doshi et al. | 370 | 79 |
| 5 | 1 | 6 | 3 | 0 | 4 | 6 | 11/10/92 | Hahne et al. | 370 | 79 |
| 5 | 4 | 5 | 7 | 6 | 8 | 7 | 10/10/95 | Newman | 370 | 85.3 |
| 5 | 2 | 5 | 5 | 2 | 6 | 4 | 10/19/93 | Cotton et al. | 370 | 24 |
| 5 | 1 | 4 | 6 | 5 | 6 | 0 | 9/8/92 | Goldberg et al. | 395 | 200 |
| 5 | 0 | 6 | 0 | 2 | 2 | 8 | 10/22/91 | Tsutsui et al. | 370 | 85.13 |
| 4 | 9 | 4 | 7 | 3 | 9 | 0 | 8/7/90 | Sheehy | 370 | 85.13 |

UNITED STATES PATENT AND TRADEMARK OFFICE
CERTIFICATE OF CORRECTION

PATENT NO. : 5,787,086

DATED : July 28, 1998

INVENTOR(S) : Robert B. McClure, et al.

It is certified that error appears in the above-identified patent and that said Letters Patent is hereby corrected as shown below:

OTHER DOCUMENTS *(including Author, Title, Date, Pertinent Pages, Etc.)*

*An Ascom Timeplex White Paper, Meeting Critical Requirements with Scalable Enterprise Networking Solutions Based on a Unified ATM Foundation, pp. 1-12, April 1994.—* April 1995?

*Douglas H. Hunt, ATM Traffic Management - Another Perspective, Business Communications Review, July 1994.*

*Richard Bubenik et al., Leaf Initiated Join Extensions, Technical Committee, Signalling Subworking Group, ATM Forum/94-0325R1, July 1, 1994.*

*Douglas H. Hunt et al., Flow Controlled Virtual Connections Proposal for ATM Traffic Management (Revision R2), Traffic Management Subworking Group, ATM_Forum/94-0632R2, August 1994.*

*Flavio Bonomi et al., The Rate-Based Flow Control Framework for the Available Bit Rate ATM Service, IEEE Network, March/April 1995, pp. 25-39.*

*R. Jain, Myths About Congestion Management in High Speed Networks, Internetworking Research and Experience, Vol. 3, 101-113 (1992).*

*Douglas H. Hunt et al., Credit-Based FCVC Proposal for ATM Traffic Management (Revision R1), ATM Forum Technical Committee Traffic Management Subworking Group, ATM_Forum/94-0168R1, April 28, 1994.*

*Douglas H. Hunt et al., Action Item Status for Credit-Based FCVC Proposal, ATM Forum Technical Committee Traffic Management Subworking Group, ATM_Forum/94-0439, April 28, 1994.*

*Timothy P. Donahue et al., Arguments in Favor of Continuing Phase 1 as the Initial ATM Forum P-NNI Routing Protocol Implementation, ATM Forum Technical Committee, ATM Forum/94-0460, April 28, 1994.*

*Richard Bubenick et al., Leaf Initiated Join Extensions, Technical Committee, Signalling Subworking Group, ATM Forum/94-0325, April 28, 1994.*

*Hosein F. Badran et al., Head of Line Arbitration in ATM Switches with Input-Output Buffering and Backpressure Control, Globecom, pps. 347-351, 1991.*

UNITED STATES PATENT AND TRADEMARK OFFICE
CERTIFICATE OF CORRECTION

PATENT NO. : 5,787,086

DATED : July 28, 1998

INVENTOR(S) : Robert B. McClure, et al.

Page 13 of 13

It is certified that error appears in the above-identified patent and that said Letters Patent is hereby corrected as shown below:

| OTHER DOCUMENTS (including Author, Title, Date, Pertinent Pages, Etc.) |
|---|
| Rob Coltun et al., *PRP: A P-NNI Routing Protocol Proposal*, ATM Forum Technical Committee, ATM_Forum/94-0492, April 28, 1994. |
| Richard Bubenik et al., *Leaf Initiated Join Extensions*, ATM Forum Technical Committee, Signalling Subworking Group, ATM Forum 94-0325, April 28, 1994. |
| Richard Bubenik et al., *Requirements For Phase 2 Signaling Protocol*, ATM Forum Technical Committee, Signalling Subworking Group, ATM Forum 94-1078, January 1, 1994. |
| H.T. Kung and K. Chang, *Receiver-Oriented Adaptive Buffer Allocation in Credit-Based Flow Control for ATM Networks*, Proceedings of INFOCOM '95, April 2-6, 1995, pages 1-14. |
| H.T. Kung et al., *Credit-Based Flow Control for ATM Networks: Credit Update Protocol, Adaptive Credit Allocation, and Statistical Multiplexing*, Proceedings of ACM SIGCOMM '94 Symposium on Communications Architectures, Protocols and Applications, Aug. 31-Sept. 2, 1994, pgs. 1-14. |
| SITA, ATM RFP: C-Overall Technical Requirements, September 1994. |

Signed and Sealed this

Twenty-fifth Day of April, 2000

*Attest:*

Q. TODD DICKINSON

*Attesting Officer*  *Director of Patents and Trademarks*